(12) United States Patent
Murakami et al.

(10) Patent No.: US 11,784,343 B2
(45) Date of Patent: Oct. 10, 2023

(54) SEPARATOR FOR ELECTRICITY STORAGE DEVICES, AND ELECTRICITY STORAGE DEVICE

(71) Applicant: Asahi Kasei Kabushiki Kaisha, Tokyo (JP)

(72) Inventors: Masato Murakami, Tokyo (JP); Shintaro Inaba, Tokyo (JP); Shinya Hisamitsu, Tokyo (JP); Daisuke Inagaki, Tokyo (JP); Hiroshi Hatayama, Tokyo (JP)

(73) Assignee: Asahi Kasei Kabushiki Kaisha, Tokyo (JP)

(*) Notice: Subject to any disclaimer, the term of this patent is extended or adjusted under 35 U.S.C. 154(b) by 57 days.

(21) Appl. No.: 16/489,072

(22) PCT Filed: Nov. 9, 2018

(86) PCT No.: PCT/JP2018/041748
§ 371 (c)(1),
(2) Date: Aug. 27, 2019

(87) PCT Pub. No.: WO2019/093498
PCT Pub. Date: May 16, 2019

(65) Prior Publication Data
US 2020/0006734 A1 Jan. 2, 2020

(30) Foreign Application Priority Data
Nov. 10, 2017 (JP) ................................ 2017-217832

(51) Int. Cl.
*H01M 10/0525* (2010.01)
*H01M 50/417* (2021.01)
*H01M 50/491* (2021.01)
*H01M 50/489* (2021.01)

(52) U.S. Cl.
CPC ..... *H01M 10/0525* (2013.01); *H01M 50/417* (2021.01); *H01M 50/491* (2021.01); *H01M 50/489* (2021.01)

(58) Field of Classification Search
CPC ............. H01M 50/411; H01M 50/463; H01M 50/446; H01M 10/0525; Y02T 10/70; Y02E 60/10; H01G 11/52; H01G 11/06
See application file for complete search history.

(56) References Cited

U.S. PATENT DOCUMENTS

| | | | | |
|---|---|---|---|---|
| 3,351,495 A | * | 11/1967 | Larsen ................. | H01M 50/414 210/500.36 |
| 4,210,709 A | | 7/1980 | Doi et al. | |
| 4,387,144 A | * | 6/1983 | McCallum .............. | D21H 5/20 429/251 |
| 6,680,353 B1 | | 1/2004 | Kato et al. | |
| 8,137,846 B2 | * | 3/2012 | Nakashima ......... | H01M 50/446 429/247 |
| 10,135,054 B2 | * | 11/2018 | Mizuno .................... | B29C 48/08 |
| 2003/0129486 A1 | * | 7/2003 | Bohnstedt ........... | H01M 50/466 428/167 |
| 2003/0219650 A1 | * | 11/2003 | Saruwatari .............. | H01M 4/38 429/86 |
| 2006/0127753 A1 | * | 6/2006 | Nakashima ......... | H01M 50/489 429/251 |
| 2007/0048607 A1 | | 3/2007 | Nakashima et al. | |
| 2007/0057192 A1 | * | 3/2007 | Vogtmeier ............ | G01T 1/2018 250/370.11 |
| 2008/0096102 A1 | | 4/2008 | Hatayama et al. | |
| 2009/0168141 A1 | | 7/2009 | Nakashima et al. | |
| 2010/0099838 A1 | * | 4/2010 | Takeda ................... | B01D 71/26 526/348 |
| 2011/0171535 A1 | * | 7/2011 | Ohinshi .............. | H01M 50/431 429/247 |
| 2012/0015229 A1 | | 1/2012 | Ohashi et al. | |
| 2013/0149613 A1 | | 6/2013 | Yoshikawa et al. | |
| 2015/0030905 A1 | * | 1/2015 | Mizuno ............... | H01M 50/403 429/144 |
| 2016/0185932 A1 | | 6/2016 | Sugawara | |
| 2016/0204409 A1 | * | 7/2016 | Jeon ..................... | H01M 50/489 429/145 |
| 2016/0372730 A1 | | 12/2016 | Uchida et al. | |
| 2017/0149038 A1 | * | 5/2017 | Miura ................. | H01M 50/491 |
| 2017/0155110 A1 | | 6/2017 | Yashiki | |
| 2017/0155119 A1 | * | 6/2017 | Suzuki ............... | H01M 50/417 |
| 2017/0190805 A1 | | 7/2017 | Yamasaki et al. | |

(Continued)

FOREIGN PATENT DOCUMENTS

| | | |
|---|---|---|
| CN | 1910703 A | 2/2007 |
| CN | 106459226 A | 2/2017 |
| EP | 3113246 A1 | 1/2017 |

(Continued)

OTHER PUBLICATIONS

Nho, et al., Radiation Physics and Chemistry 132 (2017) 65-70 (Year: 2017).*
Zhang, et al., Journal of Membrane Science 509 (2016) 19-26 (Year: 2016).*
Supplementary European Search Report issued in corresponding European Patent Application No. 18877210.7 dated Nov. 27, 2020.

(Continued)

*Primary Examiner* — Sadie White
(74) *Attorney, Agent, or Firm* — Morgan, Lewis & Bockius LLP

(57) ABSTRACT

A separator for electricity storage devices, which comprises a porous layer that contains a polyolefin resin and an ionic compound, and which is configured such that: the content of the ionic compound in the porous layer is from 5% by mass to 99% by mass (inclusive); and the degree of whiteness of this separator is more than 98.0.

14 Claims, No Drawings

(56) References Cited

U.S. PATENT DOCUMENTS

2017/0365836 A1    12/2017    Ogata et al.

FOREIGN PATENT DOCUMENTS

| | | |
|---|---|---|
| EP | 3379602 A1 | 9/2018 |
| JP | H10-050287 A | 2/1998 |
| JP | 2004-303473 A | 10/2004 |
| JP | 2005-071978 A | 3/2005 |
| JP | 2005-071979 A | 3/2005 |
| JP | 2005-228511 A | 8/2005 |
| JP | 2010-053245 A | 3/2010 |
| JP | 2010-262785 A | 11/2010 |
| JP | 2012-144650 A | 8/2012 |
| JP | 2012-144663 A | 8/2012 |
| JP | 2012-160279 A | 8/2012 |
| JP | 2014-074143 A | 4/2014 |
| JP | 2015-018813 A | 1/2015 |
| JP | 2015-038012 A | 2/2015 |
| JP | 2017-091744 A | 5/2017 |
| JP | 2017-103035 A | 6/2017 |
| JP | 2017-226117 A | 12/2017 |
| WO | 2006/025323 A1 | 3/2006 |
| WO | 2010/108148 A1 | 9/2010 |
| WO | 2012/005139 A1 | 1/2012 |
| WO | 2017/086466 A1 | 5/2017 |

OTHER PUBLICATIONS

International Search Report issued in corresponding International Patent Application No. PCT/JP2018/041748 dated Dec. 18, 2018.

* cited by examiner

SEPARATOR FOR ELECTRICITY STORAGE DEVICES, AND ELECTRICITY STORAGE DEVICE

FIELD

The present invention relates to a separator for electricity storage devices and an electricity storage device using the separator.

BACKGROUND

Electricity storage devices have been used in a wide range of applications such as a power source for consumer appliances, automotive onboard power source, stationary power source, etc. Among these electricity storage devices, a lithium ion secondary battery has excellent features such as high energy density and high durability, and thus its use as a power source for electric vehicles has been rapidly expanding in recent years.

In the lithium ion secondary battery, a polyolefin microporous membrane is generally used as a separator. The separator is disposed between a positive electrode and a negative electrode to prevent electron conduction due to direct contact or short circuit between the positive and negative electrodes, while allowing ion conduction through an electrolytic solution held in microporous pores of the separator.

An electricity storage device for electric vehicles needs to have advanced input/output characteristics since charge and discharge with a large current in a short time such as quick charge and a regenerative brake are frequently carried out. Furthermore, since the electricity storage device is often disposed at high density in a limited space of a vehicle, the temperature of the battery tends to rise, and a high level of heat resistance of the separator is required from the viewpoint of ensuring safety.

In recent years, various attempts have been considered for improvement on heat resistance of separators. The most widely used method is a method for forming a heat-resistant layer mainly containing an inorganic filler and/or a heat-resistant organic resin on a base film using a polyolefin microporous membrane. For example, Patent Document 1 describes the heat-resistant layer mainly containing silica, that is formed on a polyethylene microporous membrane to improve heat resistance of the separator.

On the other hand, there has been proposed a method for enhancing heat resistance of a separator. For example, Patent Document 2 discloses an alumina-containing polyethylene microporous membrane fabricated by combined use of a polyethylene resin and alumina. Patent Document 2 specifically describes that the microporous membrane composed of high density polyethylene and alumina particles (average particle size of 2 nm) enables to maintain the insulating property by the alumina particles even at elevated temperatures.

Moreover, in Patent Documents 3 and 4, there is also proposed a method for fabricating a silica-containing polyethylene microporous membrane using a polyethylene resin and silica in combination. Patent Documents 3 and 4 specifically describe that the shrinkage of the microporous membrane can be suppressed even at elevated temperatures exceeding the melting point of polyethylene by filling the polyethylene resin with silica in the condensed concentration.

Further, Patent Document 5 discloses a method for fabricating a barium sulfate-containing polyolefin microporous membrane by mixing a polyolefin resin and barium sulfate. Specifically, polyolefin resins such as high density polyethylene, soft polypropylene, etc., and barium sulfate (average particle size of 660 nm) as a filler are mixed, and the obtained mixture is stretched to strip at an interface between the resin and the filler, forming a porous membrane.

PRIOR ART DOCUMENTS

Patent Documents

[Patent Document 1] WO2012/005139
[Patent Document 2] Japanese Unexamined Patent Publication (Kokai) No. 1998(H10)-50287
[Patent Document 3] WO2010/108148
[Patent Document 4] Japanese Unexamined Patent Publication (Kokai) No. 2010-262785
[Patent Document 5] Japanese Unexamined Patent Publication (Kokai) No. 2005-71979

DISCLOSURE OF THE INVENTION

Problems to be Solved by the Invention

However, since in the technology described in Patent Document 1 whereby the polyethylene microporous membrane is used as a base material of the heat-resistant layer, polyethylene melts and flows at an elevated temperature, and the insulation of the separator may not be held. Moreover, this technology requires a process for manufacturing the base material and a process for forming the heat-resistant layer, also giving rise to problems of multiple processes and low productivity.

Further, in the technology described in Patent Documents 2 to 4 whereby the polyolefin microporous membrane contains metal oxide fillers, it is necessary to knead the polyolefin and the metal oxide at an elevated temperature. When the polyolefin comes into contact with the metal oxide at elevated temperatures, the polyolefin incurs metal oxide-induced deterioration, and the separator may turn to yellow. There is a concern about a voltage resistance property and oxidation resistance of the deteriorated polyolefin, which is not preferable from the viewpoint of enhancing reliability and safety of an electricity storage device. Moreover, in the electricity storage device held at elevated temperatures, the metal oxide may occasionally react with an electrolytic solution, which is also unpreferable from the viewpoint of worsening battery characteristics such as cycle characteristics, etc., or impairing safety due to battery swelling by gas generation.

Patent Document 5 describes a technology whereby the membrane is rendered porous by interfacial stripping of the polyolefin resin and the filler. If the particle size of the filler is large, there is a likelihood that a void with a large pore size is generated by accident, and when the membrane is used as a separator of electric storage devices, a micro short circuit or self-discharge may occur. Moreover, fillers with large particle sizes are often manufactured by pulverizing natural quarry minerals and therefore contain impurities such as metal oxides and halogen elements, which accelerates the deterioration of the polyolefin and may turn the separator to yellow.

An object of the present invention, in light of the above situations, is to provide a separator for electricity storage devices characteristic of having excellent heat resistance and ion permeability without impairing the durability of the electricity storage device, and with less deterioration of polyolefin, and to provide an electricity storage device comprising the separator.

Means for Solving the Problem

The present inventors have conducted much diligent experimentation with the aim of solving the problems described above. As a result, the present inventors have found that the problem can be solved by a separator for electricity storage devices which has a porous layer comprising a polyolefin resin and an ionic compound as well as a specific degree of whiteness, and thus have completed the present invention.

Namely, the present invention is as described below.

[1] A separator for electricity storage devices, which has a porous layer comprising a polyolefin resin and an ionic compound, wherein a content of the ionic compound in the porous layer is 5% by weight or more and 99% by weight or less in the porous layer and a degree of whiteness of the separator is greater than 98.0.

[2] The separator for electricity storage devices according to [1], wherein the degree of whiteness is 98.5 or more and 105 or less.

[3] The separator for electricity storage devices according to [1] or [2], wherein the content of the ionic compound in the porous layer is 5% by weight or more and less than 50% by weight.

[4] The separator for electricity storage devices according to [1] or [2], wherein the content of the ionic compound in the porous layer is 86% by weight or more and 99% by weight or less.

[5] The separator for electricity storage devices according to any one of [1] to [4], wherein the polyolefin resin contains polyethylene having a viscosity-average molecular weight of 600,000 or more and 5,000,000 or less.

[6] The separator for electricity storage devices according to any one of [1] to [5], wherein a content of metal oxide in the separator for electricity storage devices is 10% by weight or less.

[7] The separator for electricity storage devices according to any one of [1] to [6], wherein the ionic compound has one or more anions selected from the group consisting of a sulfate ion, a nitrate ion, a phosphate ion, and a halide ion.

[8] The separator for electricity storage devices according to any one of [1] to [7], wherein the ionic compound has one or more cations selected from the group consisting of an alkali metal ion and an alkaline earth metal ion.

[9] The separator for electricity storage devices according to any one of [1] to [8], wherein the ionic compound is barium sulfate.

[10] The separator for electricity storage devices according to any one of [1] to [9], wherein an average particle size of the ionic compound is 5 nm or more and 600 nm or less.

[11] The separator for electricity storage devices according to any one of [1] to [10], wherein an average pore size of the separator for electricity storage devices is 10 nm or more and 100 nm or less.

[12] The separator for electricity storage devices according to any one of [1] to [11], wherein an air permeability of the separator for electricity storage devices is 10 seconds/100 ml or longer and 500 seconds/100 ml or shorter.

[13] The separator for electricity storage devices according to any one of [1] to [12], wherein a puncture strength of the separator for electricity storage devices is 100 gf or more and 600 gf or less.

[14] The separator for electricity storage devices according to any one of [1] to [13], wherein a viscosity-average molecular weight of the polyolefin resin comprised in the separator for electricity storage devices is 300,000 or more and 5,000,000 or less.

[15] An electricity storage device comprising a positive electrode, a negative electrode, and the separator for electricity storage devices according to any one of [1] to [14].

Effects of the Invention

The present invention enables to provide a separator for electricity storage devices having excellent heat resistance and ion permeability without impairing durability of an electricity storage device, and with less deterioration of polyolefin, and to provide an electricity storage device comprising the separator.

Mode for Carrying Out the Invention

Embodiments for carrying out the invention (hereunder referred to as "the present embodiment") will now be explained in detail. It is to be understood, however, that the present invention is not limited to the following embodiments and may be implemented with appropriate modifications within the scope of its gist.

<<Porous Layer>>

The separator for electricity storage devices according to the present embodiment has a porous layer comprising a polyolefin resin and an ionic compound. The porous layer contributes to improve not only heat resistance and ion permeability of the separator but also safety and input/output characteristics of an electricity storage device without deterioration of the electricity storage device by combined use of the polyolefin resin and the ionic compound.

The thickness of the porous layer is preferably 1 μm or more, more preferably 2 μm or more, and still more preferably 3 μm or more. When the thickness of the porous layer is 1 μm or more, the heat resistance of the separator is improved. Also, the thickness of the porous layer is preferably 20 μm or less, more preferably 18 μm or less, and still more preferably 16 μm or less. When the thickness of the porous layer is 20 μm or less, the energy density of an electricity storage device can be increased.

The porosity of the porous layer is preferably 30% or more, more preferably 35% or more, and still more preferably 40% or more from the viewpoint of enhancing the ion permeability of the separator. On the other hand, from the viewpoint of maintaining the structural stability of the separator, it is preferably 70% or less, more preferably 65% or less, and still more preferably 60% or less.

The thickness proportion of the porous layer relative to the whole separator for electricity storage devices is preferably greater than 0% and 100% or less, more preferably 10% or more and 100% or less, and still more preferably 20% or more and 100% or less in consideration of the heat resistance, ion permeability and physical strength of the separator. The thickness proportion of the porous layer being 100% is preferred to facilitate manufacturing. On the other hand, even if the thickness proportion of the porous layer is less than 100%, since the high heat resistance of the porous layer can be imparted to the whole separator, it may be less than 100%.

The method for fabricating the porous layer is not particularly limited, and multiple methods can be employed. Specifically, stretching steps such as uniaxial stretching, biaxial stretching, etc.; removal steps of a third component other than the polyolefin resin and ionic compound by the means such as extraction, volatilization, decomposition, etc., may be applied. As the third component, plasticizers such as liquid paraffin, dioctyl phthalate, etc.; solvents such as acetone, water, etc.; and inorganic substances such as calcium carbonate, silica, etc., can be used alone or in combination thereof. As a method for fabricating the porous layer, from the viewpoint of reducing a manufacturing cost of the separator and improving quality such as thickness uniformity, etc., it is preferable to have at least the stretching step, and more preferable to have the stretching step and the third component removal step, still more preferable to have the stretching step and the third component extraction step, and particularly preferable to have the biaxial stretching step and the plasticizer extraction step. When the porous layer is fabricated by these methods, not only the porous layer can be formed uniformly but also physical property adjustment such as the entire thickness, porosity, etc., of the separator for electricity storage devices is facilitated.

<<Polyolefin Resin>>

The separator for electricity storage devices according to the present embodiment has a porous layer comprising a polyolefin resin. The polyolefin resin used in the present embodiment is a polyolefin resin used for general extrusion, injection, inflation, blow molding, etc., and is a polymer comprising olefin hydrocarbon as a monomer component, such as a homopolymer, copolymer and multistage polymer of ethylene, propylene, 1-butene, 2-butene, 4-methyl-1-pentene, 1-hexene, 1-octene, etc. Also, the polyolefin selected from the group consisting of the homopolymer, copolymer, and multistage polymer can be used alone or in admixture.

As the polyolefin resin, examples thereof include low density polyethylene (density 0.910 g/cm$^3$ or more and less than 0.930 g/cm$^3$), linear low density polyethylene (density 0.910 g/cm$^3$ or more and 0.940 g/cm$^3$ or less), middle density polyethylene (density 0.930 g/cm$^3$ or more and less than 0.942 g/cm$^3$), high density polyethylene (density 0.942 g/cm$^3$ or more), ultra-high molecular weight polyethylene (density 0.910 g/cm$^3$ or more and 0.970 g/cm$^3$ or less), isotactic polypropylene, syndiotactic polypropylene, atactic polypropylene, polybutene, polymethylpentene and ethylene propylene rubber.

The proportion of the polyolefin resin in the porous layer is preferably greater than 0% by weight, more preferably 1% by weight or more, and still more preferably 2% by weight or more. When the proportion of the polyolefin resin is greater than 0% by weight, not only formation of the porous layer is facilitated, but also physical strength can be imparted to the porous layer. Moreover, this proportion is preferably 95% by weight or less, more preferably 90% by weight or less, and still more preferably 85% by weight or less. When the proportion of the polyolefin resin is 95% by weight or less, the heat resistance of the porous layer tends to be high.

The proportion of the polyolefin resin in the entire separator for electricity storage devices is preferably 5% by weight or more, more preferably 10% by weight or more, and still more preferably 15% by weight or more. When the proportion of the polyolefin resin is 5% by weight or more, sufficient physical strength can be imparted to the separator. Moreover, this proportion is preferably 95% by weight or less, more preferably 90% by weight or less, and still more preferably 85% by weight or less. When the proportion of the polyolefin resin is 95% by weight or less, the heat resistance of the separator tends to be high.

The polyolefin resin preferably contains high density polyethylene. The proportion of the high density polyethylene in the polyolefin resin is preferably 10% by weight or more, more preferably 35% by weight or more, still more preferably 50% by weight or more, and may be 100% by weight. When the proportion of the high density polyethylene in the polyolefin resin is 10% by weight or more, the strength of the separator is increased due to the entanglement of the high density polyethylene molecular chains.

The polyolefin resin preferably contains high molecular weight polyethylene. The proportion of the high molecular weight polyethylene in the polyolefin resin is preferably 30% by weight or more, more preferably 50% by weight or more, and still more preferably 65% by weight or more, and it may be 100% by weight. The viscosity-average molecular weight (Mv) of the high molecular weight polyethylene is preferably 600,000 or higher and 5,000,000 or lower, more preferably 650,000 or higher and 4,000,000 or lower, and still more preferably 700,000 or higher and 3,000,000 or lower. The viscosity-average molecular weight can be determined by measuring the intrinsic viscosity at 135° C. in a decalin solvent based on ASTM-D4020 and calculating from the equation corresponding to the polyolefin resin. For polyethylene, Mv can be calculated by the following equation.

$$[\eta]=6.77\times10^{-4}\,mv^{0.67}$$

For polypropylene, Mv can be calculated by the following equation.

$$[\eta]=1.10\times10^{-4}\,mv^{0.80}$$

It is preferable to use the polyolefin resin having a viscosity-average molecular weight of 600,000 or more from the viewpoint of maintaining a high melt tension to ensure favorable moldability when melt-kneading a polyolefin resin composition, and from the viewpoint of imparting sufficient entanglement to the polyolefin resin molecules to increase strength of the separator. On the other hand, adjusting the viscosity-average molecular weight to 5,000,000 or less is preferable from the viewpoint of improving stability of extrusion molding of the polyolefin resin.

From the viewpoint of improving the heat resistance of the separator, the polyolefin resin preferably contains polypropylene. The proportion of polypropylene in the polyolefin resin is preferably 1% by weight or more, more preferably 5% by weight or more, and still more preferably 15% by weight or more. Also, the proportion of polypropylene in the polyolefin resin is preferably 30% by weight or less, more preferably 20% by weight or less, and still more preferably 10% by weight or less. It is preferable to adjust the proportion of polypropylene to 1% by weight or more from the viewpoint of improving the heat resistance of the separator. On the other hand, from the viewpoint of enhancing the uniformity of the separator, the proportion of polypropylene is preferably 30% by weight or less.

In the polyolefin resin used in the present embodiment, if necessary, antioxidants such as phenol-based, phosphorus-based, sulfur-based antioxidants, etc., metal soaps such as calcium stearate, lithium stearate, etc., additives such as ultraviolet light absorbers, light stabilizers, antistatic agents, antifogging agents, color pigments, etc., can be mixed and used, provided that the advantages of the present invention are not impaired.

<<Ionic Compound>>

The separator for electricity storage devices according to the present embodiment has a porous layer comprising an ionic compound. The ionic compound used in the present embodiment refers to a compound that is composed of a combination of one or more cations and one or more anions and is electrically neutral based on strong chemical bonding such as ionic bonding.

The ionic compound is not particularly restricted provided it is composed of a combination of a cation and an anion, however, examples thereof include sulfates such as lithium sulfate, sodium sulfate, magnesium sulfate, calcium sulfate, barium sulfate, aluminum sulfate, etc.; nitrates such as lithium nitrate, sodium nitrate, magnesium nitrate, potassium nitrate, etc.; phosphates such as lithium phosphate, sodium phosphate, magnesium phosphate, potassium phosphate, etc.; halides such as lithium fluoride, sodium chloride, sodium bromide, etc.; carbonates such as lithium carbonate, sodium carbonate, sodium hydrogen carbonate, etc.; hexafluorophosphates such as lithium hexafluorophosphate, etc.; tetrafluoroborates such as lithium tetrafluoroborate, etc.; and perchlorates such as lithium perchlorate, etc.

The anion of the ionic compound is preferably at least one species selected from the group consisting of a sulfate ion, nitrate ion, phosphate ion, and halide ion in consideration of both the stability inside an electricity storage device and the cost. It is more preferably at least one species selected from the group consisting of a sulfate ion, phosphate ion, and halide ion, furthermore preferably a sulfate ion and/or phosphate ion, and particularly preferably a sulfate ion.

Moreover, when considering both the stability inside the electricity storage device and the cost, the cation of the ionic compound is preferably at least one species selected from the group of an alkali metal ion and alkaline earth metal ion, more preferably a lithium ion, sodium ion, potassium ion, magnesium ion, calcium ion, strontium ion, or barium ion, still more preferably a magnesium ion, calcium ion, or barium ion, and particularly preferably a barium ion. Namely, as the ionic compound, barium sulfate is most preferred in consideration of the stability inside the electricity storage device.

Moreover, the ionic compound may be used singly, and two or more thereof may be used in combination.

The shape of the ionic compound may be, for example, plate-like, scaly, acicula, columnar, spherical, polyhedral, massive, etc., and s plurality of ionic compounds having the above shapes may be used in combination. The shape of the ionic compound is not particularly limited, however from the viewpoint of improvement of heat resistance, columnar, spherical or polyhedral ions are preferred, and spherical ions are more preferred.

Carbonates such as calcium carbonate, etc., have long been widely used as fillers for various polymers, and their performance as fillers has been demonstrated in various applications. However, carbonate used in a special environment such as the inside of an electricity storage device is not preferred because the carbonate may be decomposed to generate carbon dioxide. Other than carbonates, ionic compounds such as sulfates, phosphates, and halides are preferable since these have high stability inside the electricity storage device.

Metal oxides such as alumina, etc., are known to be more covalent than ionic as the nature of the chemical bonds of the metal oxide. Therefore, in the present invention, alumina, boehmite, silica, titania, yttria, zirconia, lithium oxide, sodium oxide, potassium oxide, magnesium oxide, calcium oxide, vanadium oxide, chromium oxide, manganese oxide, iron oxide, cobalt oxide, nickel oxide, copper oxide, zinc oxide and cerium oxide are classified as metal oxides and not included in ionic compounds. Also, compounds composed of a plurality of metal oxides such as potassium titanate ($K_2O \cdot 8TiO_2$), etc., are also classified as metal oxides.

The content of the metal oxide in the separator for electricity storage devices is preferably 10% by weight or less, more preferably 8% by weight or less, still more preferably 6% by weight or less, and particularly preferably 4% by weight or less. Due to this, the promotion of deterioration of the polyolefin tends to be suppressed.

The proportion of the ionic compound in the porous layer (i.e., the content of the ionic compound in the porous layer) is preferably 5% by weight or more, more preferably 10% by weight or more, and still more preferably 15% by weight or more. When the proportion of the ionic compound is 5% by weight or more, the heat resistance of the porous layer tends to be improved, however from the viewpoint of securing sufficient heat resistance in actual use, it is desirably 86% by weight or more, more desirably 90% by weight or more, and still more desirably 95% by weight or more. On the other hand, from the viewpoint of enhancing the ion permeability of the porous layer while maintaining the physical strength thereof, it is preferably 5% by weight or more, preferably 10% by weight or more, and still more preferably 15% by weight or more.

Also, this proportion is 99% by weight or less, more preferably 98.5% by weight or less, and still more preferably 98% by weight or less. When the proportion of the ionic compound is 99% by weight or less, not only formation of the porous layer is facilitated, but also the physical strength can be imparted to the porous layer. On the other hand, from the viewpoint of further enhancing the physical strength of the porous layer, the proportion being 50% by weight or less is preferable, the proportion of 45% by weight or less is more preferable, and the proportion of 40% by weight or less is furthermore preferable.

The proportion of the ionic compound in the entire separator for electricity storage devices is preferably 5% by weight or more, more preferably 10% by weight or more, and still more preferably 15% by weight or more. When the proportion of the ionic compound in the entire separator is 5% by weight or more, the heat resistance of the separator tends to be improved. Moreover, this proportion is preferably 95% by weight or less, more preferably 90% by weight or less, and still more preferably 85% by weight or less. If the proportion of the ionic compound in the entire separator is 95% by weight or less, fall off of the ionic compound from the separator tends to be preventable.

Since the specific gravity of the ionic compound is generally higher than the specific gravity of the polyolefin resin, it may also be more appropriate to denote the proportion of the ionic compound in the separator as % by volume rather than % by weight. The aforementioned proportion is preferably 2% by volume or more to 90% by volume or less, more preferably 5% by volume or lore and 80% by volume or less, and still more preferably 8% by volume or more and 70% by volume or less. When the proportion of the ionic compound is 2% by volume or more, the heat resistance of the separator tends to be improved. Moreover, when it is 90% by volume or less, fall off of the ionic compound from the separator tends to be preventable.

An average particle size of the ionic compound is preferably 5 nm or more and 600 nm or less, more preferably 10 nm or more and 500 nm or less, and still more preferably 20 nm or more and 400 nm or less. The average particle size refers to an average value of particle sizes of 10 ionic compounds which can be confirmed in a visual field image when the porous layer is observed at magnification of 30,000× using a scanning electron microscope. When calculating the average particle size, the particle size of each particle being present in the form of single particle, is used, and if the particles are aggregated, the particle size of the primary particle constituting the aggregate can be adopted.

When the average particle size of the ionic compound is 5 nm or more, the membrane thickness and the pore distribution of the separator are uniformed, and the input/output characteristics of the electricity storage device are improved. Also, when the average particle size is 600 nm or less, the pore size of the separator is uniformed, and any large pore portion is hardly formed locally, thereby improving safety of the separator for electricity storage devices.

<<Separator for Electricity Storage Devices>>

The separator for electricity storage devices has a porous structure in which the large number of extremely fine pores gather to form dense percolated pores, thereby capable of exhibiting ion conductivity by impregnating an electrolytic solution as well as favorable voltage resistance and high physical properties. The separator for electricity storage devices may be in the form of single layer membrane or a multilayer membrane.

The membrane thickness of the separator for electricity storage devices is preferably 0.1 μm or more and 100 μm or less, more preferably 1 μm or more and 50 μm or less, and still more preferably 3 μm or more and 25 μm or less. A membrane thickness of 0.1 μm or more is preferable from the viewpoint of mechanical strength, and a membrane thickness of 100 μm or less is preferable from the viewpoint of increasing a battery capacity. The membrane thickness of the separator can be adjusted by controlling the die lip gap, the stretching ratio in the stretching step, etc.

The average pore size of the separator for electricity storage devices is preferably 10 nm or more and 100 nm or less, more preferably 20 nm or more and 90 nm or less, still more preferably 30 nm or more and 80 nm or less, and particularly preferably 40 nm or more and 70 nm or less from the viewpoint of ion conductivity and voltage resistance. The average pore size can be adjusted by controlling the composition ratio, cooling rate of an extruded sheet, stretching temperature, stretching ratio, heat setting temperature, stretching ratio during heat setting, relaxation ratio during heat setting, or by combining thereof.

The average pore size can be measured by a gas-liquid method. Specifically, it has been known that a fluid inside a capillary follows the Knudsen flow when the mean free path of the fluid is larger than the pore size of the capillary, and when it is smaller, the fluid follows the Poiseuille flow. Then, it is assumed that the flow of air follows the Knudsen flow in measurement of the air permeability of the separator, and the flow of water follows the Poiseuille flow in the measurement of water permeability.

In this case, the average pore size d (μm) of the porous membrane and the tortuosity factor $\tau_a$ (dimensionless) are calculated with the air permeation rate constant $R_{gas}$ (m³/(m² second·Pa)), the water permeation rate constant $R_{liq}$ (m³/(m²·second·Pa)), molecular velocity of air ν (m/second), viscosity of water η (Pa·second), standard pressure $P_s$ (=101325 Pa), porosity ε (%), membrane thickness L (μm), according to the following equation:

$$d = 2\nu \times (R_{liq}/R_{gas}) \times (16\eta/3P_s) \times 10^6$$

$$\tau a = (d \times (\varepsilon/100) \times \nu/(3L \times P_s \times R_{gas}))^{1/2}$$

Here, $R_{gas}$ was determined from the air permeability (second) using the following equation:

$$R_{gas} = 0.0001/(\text{air permeability} \times (6.424 \times 10^{-4}) \times (0.01276 \times 101325))$$

Also, $R_{liq}$ was determined from the water permeability (cm³/(cm²·second·Pa)) using the following equation:

$$R_{liq} = \text{water permeability}/100$$

Here, the water permeability was determined as follows. A separator previously immersed in ethanol was set in a stainless steel cell with a diameter of 41 mm for liquid permeation, and after the ethanol in the separator was washed with water, water was allowed to permeate with a differential pressure of about 50000 Pa. From the amount (cm³) of the water permeated for 120 seconds, the water permeability per unit time·unit pressure·unit area, was calculated, which was taken as the water permeability.

Also, ν was calculated with the gas constant R (=8.314 J/(K·mol)), absolute temperature T (K), circumferential ratio π, and average molecular weight of air M (=2.896×10⁻² kg/mol), using following equation:

$$\nu = ((8R \times T)/(\pi \times M))^{1/2}$$

The porosity of the separator for electricity storage devices is preferably 25% or more to 95% or less, more preferably 30% or more to 85% or less, still more preferably 35% or more to 75% or less, and particularly preferably 40% or more to 65% or less. A porosity of 25% or more is preferable from the viewpoint of improving ion conductivity, and the porosity of 95% or less is preferable from the viewpoint of voltage resistance. The porosity of the separator may be adjusted by controlling the mixing ratio of the polyolefin resin composition and the plasticizer, stretching temperature, stretching ratio, heat setting temperature, stretching ratio during heat setting, relaxation ratio during heat setting, or by combining these properties.

The air permeability of the separator for electricity storage devices is preferably 10 seconds/100 ml or longer and 500 seconds/100 ml or shorter, more preferably 20 seconds/100 ml or longer and 400 seconds/100 ml or shorter, still more preferably 30 seconds/100 ml or longer and 300 seconds/100 ml or shorter, and particularly preferably 40 seconds/100 ml or longer and 200 seconds/100 ml or shorter. When the air permeability is 10 seconds/100 ml or longer, the self-discharge tends to be reduced when used as a separator for electricity storage devices, and when it is 500 seconds/100 ml or shorter, favorable input/output characteristics tends to be obtainable, which is preferable.

The puncture strength of the separator for electricity storage devices is preferably 100 gf or more, more preferably 200 gf or more, still more preferably 300 gf or more, preferably 600 gf or less, more preferably 500 gf or less, and still more preferably 400 gf or less. Adjusting the puncture strength to 100 gf or more is preferable from the viewpoint of suppressing membrane rupture due to the active material, etc. that dropped off when the membrane is wound into a battery, and is also preferable to reduce concern for short circuit due to swelling and shrinkage of electrodes accompanied by charge and discharge. On the other hand, it is preferable to adjust the puncture strength to 600 gf or less from the viewpoint allowing to reduce shrinkage due to orientation relaxation when heating.

The viscosity-average molecular weight of the polyolefin resin comprised in the separator for electricity storage devices is preferably 200,000 or more and 5,000,000 or less, more preferably 300,000 or more and 3,000,000 or less, and still more preferably 400,000 or more and 1,000,000 or more. When the viscosity-average molecular weight is 200,000 or more, the melt tension in melt molding is increased, thereby improving moldability, and there is a likelihood of high strength due to entanglement between polyolefin resins.

When the viscosity-average molecular weight is 5,000,000 or less, which facilitates melt-kneading uniformly, and the sheet tends to be excellent in moldability, particularly thickness stability. Furthermore, when used as a separator for electricity storage devices, if the viscosity-average molecular weight of the separator is less than 1,000,000, pores have a likelihood of being clogged when a temperature rises, which is preferable because a favorable fuse function tends to be obtainable.

The degree of whiteness of the separator for electricity storage devices is more than 98.0 and 105 or less, preferably 98.5 or more and 104 or less, and more preferably 99 or more and 103 or less. When the degree of whiteness of the separator is more than 98.0, the deterioration of the polyolefin is small, so that the reliability and safety of the electricity storage device can be improved. When the degree of whiteness of the separator is 105 or less, it is preferable from the viewpoint of practical use because a separator in which the polyolefin is less deteriorated can be efficiently manufactured.

The degree of whiteness is measured using a colorimeter "SC-T" (manufactured by Suga Test Instruments Co., Ltd.) under a condition that does not include a specular reflection light in a 2° viewing angle. When the thickness of the separator is 20 μm or less, the color of the back surface of the separator surface that is to be detected may be detected, which leads to incorrect measurement of the degree of whiteness of the separator. Therefore, when the thickness of the separator is 20 μm or thinner, the degree of whiteness is defined as the one that is measured under the condition with the separator that is folded to the total thickness of 20 μm or more.

The voltage resistance of the separator for electricity storage devices can be measured using a voltage resistance/insulation resistance tester (TOS 9201, manufactured by Kikusui Electronics Co., Ltd.). Specifically, for example, the separator is sandwiched by smooth metal plates, and voltage is applied and increased at a speed of 1 kV/second, followed by measurement of a voltage value at which a short circuit is detected (AC 60 Hz). When comparing the voltage resistance value of the separator having a different thickness, it is possible to compare the intrinsic voltage resistance value normalized in terms of separator thickness, and therefore in the Examples described later, each separator is compared by calculating the voltage resistance value that is converted to that per thickness of 20 μm. The voltage resistance (kV/20 μm) per 20 μm is preferably 1.3 kV/20 μm or more, more preferably 1.4 kV/20 μm or more and still more preferably 1.5 kV/20 μm or more from the viewpoint of suppressing membrane rupture due to an active material, etc., that dropped off when fabricating a wound body.

The reason for the suppression of deterioration of the polyolefin comprised in the separator for electricity storage devices of the present embodiment is not necessarily clarified and is not limited to the action or principle described in this paragraph, however, it is conjectured because a filler not inducing deterioration is used in the separator of the present embodiment. As one of methods for preparing fine particles of metal oxides such as silica, etc., a method (combustion method) for hydrolyzing $SiCl_4$ at an elevated temperature has been known. In this case, it is surmised that since it is difficult to completely remove hydrogen chloride by-produced, deterioration of the polyolefin is promoted by the remaining acidic component. On the other hand, for ionic compounds, a chemical synthesis method such as coprecipitation method is often used for producing fine particles. The chemical synthesis method has a likelihood to reduce the amount of impurities compared to the method for pulverizing natural ore, and the deterioration of the polyolefin due to the impurities is considered to hardly occur. It is conjectured to be possible to increase the degree of whiteness of the resulting separator to over 98.0 by using an ionic compound with few impurities.

Furthermore, the separator for electricity storage devices of the present embodiment preferably comprises polyethylene having a viscosity-average molecular weight of 600,000 or more from the viewpoint of enhancing the degree of whiteness. The reason for the degree of whiteness being improved when using the above polyethylene is not necessarily clear, and is not limited to the action or principle described in this paragraph, however, it is conjectured that when containing polyethylene having a viscosity-average molecular weight of 600,000 or more, the fibril portion constituting the porous layer is densified as a consequence of a high degree of entanglement of the polyethylene with the ionic compound, so that the reflected light is unified, consequently giving rise to tendency for the degree of whiteness of the separator to be higher.

Namely, when the separator of the present embodiment comprises the polyolefin resin and the ionic compound in the same layer, and in particular, comprises polyethylene having a viscosity-average molecular weight of 600,000 or more, a separator having the degree of whiteness of more than 98.0 tends to be obtainable, which is preferred.

<<Manufacturing Method of Separator for Electricity Storage Devices>>

Although an example will be described regarding the method for manufacturing the separator for electricity storage devices according to the present embodiment, it is not necessarily restricted to this example. The method for manufacturing the separator may include, for example, the following steps:

(1) a step of melt-kneading the polyolefin resin, ionic compound, and plasticizer to obtain a kneaded product, (2) a step of transferring the kneaded product, molding it into sheet form, and then cooling and solidifying it, (3) a step of stretching the sheet molding at least in a uniaxial direction at a stretching ratio by area of 20 times or more and less than 200 times, and (4) a step of extracting the plasticizer from the sheet molding after the stretching step.

In step (1), the polyolefin resin, ionic compound, and plasticizer are melt-kneaded. As a melt-kneading method, an example thereof includes such as feeding the polyolefin resin, the ionic compound and, if necessary, other additives into a resin-kneading apparatus such as an extruder, kneader, laboplastmill, kneading roll, Banbury mixer, etc., and introducing and kneading the plasticizer by arbitrary ratios while heat-melting the resin components.

Although the plasticizer is not particularly restricted, however, a non-volatile solvent that enables to form a uniform solution above the melting point of polyolefin resin is preferably used. Specific examples of such a non-volatile solvent include, for example, hydrocarbons such as liquid paraffin, paraffin wax, etc.; esters such as dioctyl phthalate, dibutyl phthalate, etc.; higher alcohols such as oleyl alcohol, stearyl alcohol, etc. These plasticizers may be recovered by operations such as distillation, etc., after the extraction, and may be reused. Furthermore, the polyolefin resin, ionic compound, other additives, and plasticizer are preferably preliminarily kneaded at a prescribed proportion thereof using a Henschel mixer, etc., before introduced into a resin-kneading apparatus. More preferably, in the pre-kneading, the plasticizer is partially introduced, and the remaining plasticizer is kneaded while being appropriately heated and side-fed to the resin kneading apparatus. By using such a kneading method, the dispersibility of the plasticizer is enhanced, and when stretching a sheet molding of the melt-kneaded product of the resin composition and the plasticizer in a later step, the sheet molding tends to be stretchable at a high ratio without rupture of the membrane.

Among the plasticizers, liquid paraffin is preferable because in the case that the polyolefin resin is polyethylene or polypropylene, the liquid paraffin is highly compatible with these, and even if the melt-kneaded product is stretched, interfacial stripping between the resin and the plasticizer hardly occurs, facilitating to implement uniform stretching.

The proportion of the polyolefin resin, the ionic compound, and the plasticizer is not particularly limited provided these can be melt-kneaded uniformly and molded into sheet form. For example, the weight fraction of the plasticizer in the composition composed of the polyolefin resin, the ionic compound, and the plasticizer is preferably 10 to 90% by weight, and more preferably 20 to 80% by weight. When the weight fraction of the plasticizer is 90% by weight or less, the melt tension during melt-molding tends to be sufficient for improving moldability. On the other hand, when the weight fraction of the plasticizer is 10% by weight or more, no scission of the polyolefin molecular chains takes place even when the mixture of the polyolefin resin composition and the plasticizer is stretched at a high ratio, facilitating to form a uniform and microporous structure and also to increase strength.

In step (2), the melt-kneaded product is formed into sheet form. As a method for manufacturing a sheet molding, an example thereof includes such as extruding a melt-kneaded product in sheet from via a T die, etc., bringing the sheet in contact with a heat conductor, and cooling to a temperature sufficiently lower than the crystallization temperature of the resin component followed by solidification thereof. As a heat conductor used for cooling solidification, a metal, water, air, plasticizer, etc., are included. Among these, a metal roll is preferable due to high heat conduction efficiency thereof. Also, when the extruded kneaded-product is subjected to contact with the metal roll, it is preferable to sandwich it between the rolls, from which not only the efficiency of heat conduction is further increased, but also the membrane strength is increased due to orientation of the sheet, which further tends to improve the surface smoothness of the sheet. The die lip gap when extruding the melt-kneaded product in sheet form from the T-die is preferably 200 μm or more to 3,000 μm or less, and more preferably 500 μm or more and 2,500 μm or less. When the die lip gap is 200 μm or more, the resin waste, etc., are reduced, the influence on membrane quality such as streaks and defects is small, and the risk of membrane rupture, etc., can be reduced in the subsequent stretching step. On the other hand, when the die lip gap is 3,000 μm or less, the cooling rate is fast, which enables to prevent cooling unevenness, and the thickness stability of the sheet can be maintained.

Also, the sheet molding may be subjected to rolling. The rolling can be carried out by, for example, a press method using a double belt press machine, etc. By the rolling, the orientation of in particular, the surface layer portion can be promoted. The rolling ratio by area is preferably more than one time and three times or less, and more preferably more than one time and two times or less. When the rolling ratio is more than one time, the plane orientation tends to be increased and the membrane strength of the finally obtained separator tends to be increased. On the other hand, when the rolling ratio is three times or less, the difference in orientation between the surface layer portion and the inside of the center is small, which tends to facilitate formation of a uniform porous structure in a thickness direction of the membrane.

In step (3), the aforementioned sheet molding is subjected to stretching. Stretching may also be carried out after extracting the plasticizer from the sheet molding. Furthermore, it may also be carried out before and after extracting the plasticizer from the aforementioned sheet molding.

Although either uniaxial stretching or biaxial stretching can be suitably applied as the stretching treatment, biaxial stretching is preferable from the viewpoint of improving the strength of the obtained separator. Upon biaxial stretching of the sheet molding at a high stretching ratio, the molecules are oriented in a plane direction, and the separator finally obtained hardly tears and has high puncture strength. Examples of the stretching method include such as simultaneous biaxial stretching, sequential biaxial stretching, multistage stretching, multiple-time stretching, etc. Simultaneous biaxial stretching is preferable from the viewpoint of improvement on puncture strength, stretching uniformity, and fuse characteristics. Further, from the viewpoint of controllability of plane orientation, sequential biaxial stretching is preferred.

Here, simultaneous biaxial stretching refers to a stretching method in which MD (machine direction of continuous separator processing) stretching and TD (transverse direction crossing the MD of the separator at an angle of 90°) are simultaneously carried out, and the stretching ratio in each direction may be different. Sequential biaxial stretching is referred to as a stretching method in which MD stretching and TD stretching are each carried out independently, and upon MD stretching or TD stretching, the other direction is in a non-constrained state or in anchored state with fixed length.

The stretching ratio is preferably in the range of 20 times or more and 200 times or less in terms of a ratio by area, and more preferably in the range of 25 times or more and 150 times or less. The stretching ratio in each axial direction is preferably 4 times or more and 15 times or less in MD and 4 times or more and 15 times or less in TD, and more preferably 5 times or more and 12 times or less in MD and 5 times or more and 12 times or less in TD. When the total ratio by area is 25 times or more, sufficient strength tends to be imparted to the obtained separator, while when the total ratio by area is 200 times or less, membrane rupture during the stretching step is prevented and high productivity tends to be achieved.

In step (4), the plasticizer is removed from the sheet molding to form a separator. As a method for removing the plasticizer, an example thereof includes such as immersing the sheet molding in an extraction solvent to extract the plasticizer followed by fully drying. The plasticizer may be extracted either batchwise or continuously. In order to suppress the shrinkage of the separator, it is preferable to constrain the edges of the sheet molding in a series of steps such as immersion and drying. Moreover, it is preferable to adjust the amount of residual plasticizer in the separator to less than 1% by weight with respect to the weight of the entire separator.

As an extraction solvent used when extracting a plasticizer, it is preferable to use a solvent which is a poor solvent for the polyolefin resin and a good solvent for the plasticizer and has a boiling point lower than the melting point of the polyolefin resin. Examples of such extraction solvents include hydrocarbons such as n-hexane, cyclohexane, etc.; halogenated hydrocarbons such as methylene chloride, 1,1, 1-trichloroethane, etc.; non-chlorinated halogenated solvents such as hydrofluoroether, hydrofluorocarbon, etc.; alcohols such as ethanol, isopropanol, etc.; ethers such as diethyl ether, tetrahydrofuran, etc.; and ketones such as acetone, methyl ethyl ketone, etc. These extraction solvents may be recovered by operations such as distillation, etc., and may be reutilized.

In order to suppress shrinkage of the separator, heat treatment can also be carried out with the aim of heat setting after the stretching step or after formation of the separator. Moreover, the separator may be subjected to post-treatments such as hydrophilization treatment with a surfactant, etc., crosslinking treatment with an ionizing radiation, etc.

The separator is preferably subjected to heat treatment for the purpose of heat setting from the viewpoint of suppressing the shrinkage. As a method of heat treatment, with the aim of adjusting physical properties, examples of the heat treatment include stretching operation carried out at a prescribed temperature atmosphere and prescribed stretching ratio, and/or relaxation operation carried out at a prescribed temperature atmosphere and prescribed relaxation ratio for the purpose of reduction of stretching stress. The relaxation operation may be carried out following the stretching operation. These heat treatments can be carried out using a tenter or a roll stretcher.

The stretching operation is preferably carried out by stretching 1.1 times or more, more preferably 1.2 times or more in MD and/or TD of the membrane, from the viewpoint of obtaining a separator with higher strength and higher porosity. The relaxation operation is a shrinking operation in MD and/or TD of the membrane. The relaxation ratio is referred to as a value obtained by dividing the dimension of the membrane after the relaxation operation by the dimension of the membrane before the relaxation operation. When relaxation was carried out in both MD and TD, the relaxation ratio means a value obtained by multiplying the relaxation ratio of MD and the relaxation ratio of TD. The relaxation ratio is preferably 1.0 or less, more preferably 0.97 or less, and still more preferably 0.95 or less. The relaxation ratio is preferably 0.5 or more from the viewpoint of membrane quality. The relaxation operation may be carried out in both MD and TD, however, may be carried out in either MD or TD.

The stretching and relaxation operations after this plasticizer extraction are preferably carried out in TD. In contrast to the melting point (hereinafter also referred to as "Tm") of the polyolefin resin, the temperature of the stretching and relaxation operations is preferably Tm−20° C. or higher and Tm+20° C. or lower, and more preferably Tm−10° C. or higher and Tm+10° C. or lower. The temperature of the stretching and relaxation operations in the aforementioned range is preferred from the viewpoint of the balance of reduction of heat shrinkage and the porosity.

When the separator is fabricated by a "wet method" for forming pores by plasticizer extraction, the pore size, pore shape, and distribution of the position of the pores are easily equalized, as a result, the reflected light of the separator is uniformed, and thereby the degree of whiteness of the separator tends to be high. Therefore, from the viewpoint of increasing the degree of whiteness of the separator to greater than 98.0, it is preferable to carry out the method of pore formation by the plasticizer extraction.

The separator for electricity storage devices of the present embodiment itself functions sufficiently as a separator for electricity storage devices, but if necessary, a surface of the separator may be coated with an inorganic material and/or organic material to form a laminated membrane. The separator for electricity storage devices of the present embodiment has high heat resistance with less deterioration in polyolefin, thereby improving reliability and safety of the electricity storage device.

<<Electricity Storage Device>>

The electricity storage device of the present embodiment is provided with a positive electrode, negative electrode, and the separator for electricity storage devices according to the present embodiment. Specific examples of the electricity storage device include a lithium secondary battery, lithium ion secondary battery, sodium secondary battery, sodium ion secondary battery, magnesium secondary battery, magnesium ion secondary battery, calcium secondary battery, calcium ion secondary battery, aluminum secondary battery, aluminum ion secondary battery, nickel metal hydride battery, nickel cadmium battery, electric double layer capacitor, lithium ion capacitor, redox flow battery, lithium sulfur battery, lithium air battery, zinc air battery, etc. Among the aforementioned batteries, from the viewpoint of practicality, a lithium secondary battery, lithium-ion secondary battery, nickel metal hydride battery, or lithium ion capacitor is preferable, and a lithium ion secondary battery is more preferable.

The electricity storage device of the present embodiment can be fabricated by combining the positive electrode and the negative electrode described above via the separator, winding as necessary to form a laminated electrode body or a wound electrode body, loading it into an outer package, connecting the positive and negative electrodes to positive and negative electrode terminals of the outer package via a lead, etc., and further injecting a nonaqueous electrolytic solution containing a nonaqueous solvent such as cyclic carbonate or linear carbonate, etc., and an electrolyte such as lithium salt, etc., into the outer package, followed by sealing the outer package.

The outer package of the electricity storage device is not particularly limited, but a metal can container, a laminate container composed of a metal foil laminate film, etc., can be suitably used. The shape of the storage device is not particularly limited, and for example, a cylindrical, square, coin type, flat, or sheet may be employed.

<<Positive Electrode>>

The positive electrode is prepared by adding appropriate amounts of a conductive assistant such as acetylene black, etc., and binders such as polyvinylidene fluoride, etc., to a positive electrode active material to prepare a positive electrode mixture, coating a current collector such as an aluminum foil, etc., with the mixture followed by drying, and then applying pressure to adhere the positive electrode mixture layer on the current collector. It is note that the method for preparing the positive electrode is not limited to the method exemplified above.

The positive electrode active material is not particularly restricted, but from the viewpoint of structural stability of the positive electrode active material, it is preferably complex oxide of a layered oxide cathode active material represented by the chemical formula: $LiNi_xCo_yMa_{1-x-y}O_2$ wherein, Ma represents one or more selected from the group consisting of Mn and Al, $0 \leq x \leq 1$, $0 \leq y \leq 1$, and $x+y \leq 1$; a spinel-type oxide cathode active material represented by the chemical formula: $LiMn_{2-x}Mb_xO_4$ wherein, Mb represents one or more selected from the group consisting of transition metals, and $0.2 \leq x \leq 0.7$; $Li_2McO_3$ and $LiMdO_2$ wherein, Mc and Md each independently represent one or more selected from the group consisting of transition metals, and one or more positive electrode active materials selected from the group consisting of a Li-rich layered oxide cathode material represented by the chemical formula: $zLi_2McO_3$-$(1-z)LiMdO_2$ wherein Mc and Md each independently represent one or more selected from the group consisting of transition metals, and $0.05 \leq z \leq 0.95$; olivine-type cathode active material represented by $LiMe_{1-x}Fe_xPO_4$ wherein, Me represents one or more selected from the group consisting of Mn and Co, and $0 \leq x \leq 1$, and $Li_2MfPO_4F$ wherein, Mf represents one or more selected from the group consisting of transition metals, are included.

As the layered oxide cathode active material represented by the chemical formula: $LiNi_xCo_yMa_{1-x-y}O_2$ wherein, Ma represents one or more selected from the group consisting of Mn and Al, $0 \leq x \leq 1$, $0 \leq y \leq 1$, and $x+y \leq 1$ from the viewpoint of the structural stability, it preferably has a composition represented by $LiNi_xCo_yMn_{1-x-y}O_2$ wherein, $0 \leq x \leq 1$, $0 \leq y \leq 1$ and $x+y \leq 1$ or $LiNi_xCo_yAl_{1-x-y}O_2$ wherein, $0.7 \leq x \leq 1$, $0y \leq 0.3$, and $x+y \leq 1$. As more preferable compositions, $LiCoO_2$, $LiNi_xCo_yMn_{1-x-y}O_2$ wherein, $0.3 \leq x \leq 1$, $0 \leq y \leq 0.4$, and $x+y \leq 1$ and $LiNi_{0.85}Co_{0.1}Al_{0.05}O_2$, are included.

<<Negative Electrode>>

The negative electrode is prepared by adding appropriate amounts of a thickner such as carboxymethyl cellulose, etc., and a binder such as styrene butadiene rubber, etc., to a negative electrode active material to prepare a negative electrode mixture, coating a current collector such as a copper foil, etc., with the mixture followed by drying, and then applying pressure to adhere the negative electrode mixture layer on the current collector. It is noted that the method for preparing the negative electrode is not limited to the method exemplified above.

In the present embodiment, the negative electrode active material that can be used for the negative electrode is not particularly limited, however, alloy compounds such as Al, Si, Sn, etc.; metal oxides such as CuO, CoO, etc.; lithium-containing compounds such as lithium titanate, etc.; carbon materials, etc., may be used. From the viewpoint of improving the energy density of the electricity storage device, a carbon material capable of intercalating and releasing lithium ions at a relatively low potential is preferred. Such a carbon material is not particularly restricted, however, examples thereof include hard carbon, soft carbon, artificial graphite, natural graphite, pyrolytic carbon, coke, glassy carbon, burning product of an organic polymer compound, and burning products of an organic natural product, carbon fiber, mesocarbon microbeads, carbon black, etc.

When the carbon material is used as the negative electrode active material, the interlayer distance $d_{002}$ of (002) plane of the carbon material is preferably 0.37 nm or less, more preferably 0.35 nm or less, and still more preferably 0.34 nm or less. The lower limit of $d_{002}$ is not particularly restricted but is theoretically about 0.335 nm. The size of the crystallite in the c-axis direction of the carbon material is preferably 3 nm or more, more preferably 8 nm or more, and still more preferably 25 nm or more. Although the upper limit of the size of the crystallite is not particularly limited, it is generally about 200 nm. Moreover, the average particle size of the carbon material is preferably 3 μm or more and 15 μm or less, more preferably 5 μm or more and 13 μm or less. Also, the purity of the carbon material is preferably 99.9% or higher.

The electricity storage device of the present embodiment is excellent in safety and productivity, and therefore it is not only suitable for use as an automotive battery, but also widely utilized as power sources for various appliances including batteries for customer appliances such as smartphones, etc.

EXAMPLES

The present embodiments will be described below in more detail by way of Examples, and the present invention is not limited to the Examples unless the present invention depart from the scope of the gist thereof. It is noted that the analytical method and evaluation methods used in Examples and Comparative Examples are as described below.

(1) Membrane Thickness (μm)

The membrane thickness of the sample was measured at a room temperature of 23° C. using a micro thickness gauge (type KBM, manufactured by Toyo Seiki Seisaku-sho, Ltd.).

(2) Porosity (%)

A 10 cm×10 cm square sample was cut out from the separator, the volume ($cm^3$) and weight (g) of the sample were measured, and the porosity was calculated from these and the membrane density ($g/cm^3$) using the following equation:

Porosity (%)=(volume−weight/membrane density)/volume×100

It is noted that the membrane density was used as the value calculated from each density of the polyolefin resin and the ionic compound, and the mixing ratio thereof.

(3) Air Permeability (second/100 ml)

Air permeability of a sample was measured using a Gurley type air permeability tester (manufactured by Toyo Seiki Seisaku-sho, Ltd.), according to HS P-8117.

(4) Puncture Strength (gf)

A separator was set with a sample holder having an opening diameter of 11.3 mm, using a handy compression tester "KES-G5" (manufactured by Kato Tech Co., Ltd). Subsequently, a puncture test was carried out by contacting the center of the set separator and a needle tip with curvature radius of 0.5 mm under conditions with a puncture speed of 2 mm/second and an atmospheric temperature of 25° C., and the puncture strength (gf) was obtained as the maximum puncture load.

(5) Degree of Whiteness

The degree of whiteness was measured using a colorimeter "SC-T" (manufactured by Suga Test Instruments Co., Ltd.). When the thickness of the separator was less than 20 μm, the separator was folded and adjusted to the total thickness of 20 μm or more, and the degree of whiteness was measured under a condition that does not include a specular reflection light in a 2° viewing angle.

(6) Voltage Resistance (kV/20 μm)

Using a voltage resistance/insulation resistance tester "TOS9201" (manufactured by Kikusui Electronics Co., Ltd.), the separator was sandwiched by smooth metal plates, and voltage was applied and increased at a speed of 1 kV/second, followed by measurement of a voltage value at which a short circuit was detected (AC 60 Hz). The obtained voltage value was converted to a voltage resistance value (kV/20 μm) per 20 μm according to the following equation.

Voltage resistance (kV/20 μm)=voltage measurement value (kV)×20/membrane thickness (μm)

(7) Solder Test ($mm^2$)

A soldering iron having a tip diameter of 1 mm was placed vertically to the separator fixed to a frame. The temperature of the soldering iron was raised to 400° C., and after the temperature was stabilized, the soldering iron was lowered at a speed of 10 mm/second and punctured through the separator for 3 seconds followed by elevation of the iron. The area of the hole of the separator was observed with an optical microscope, and the area was determined by image processing.

(8) Tests Using Lithium Ion Secondary Battery

<<Fabrication of Positive Electrode Sheet>>

A slurry solution was prepared by mixing $LiNi_{1/3}Mn_{1/3}C_{1/3}O_2$ (manufactured by Nippon Chemical Industrial Co., Ltd.) as the positive electrode active material, an acetylene black powder (manufactured by Denka Co., Ltd.) as the conductive assistant, and a polyvinylidene difluoride solution (manufactured by KUREHA CORPORATION) as the binder at a solid content ratio by weight of 90/6/4, and adding N-methyl-2-pyrrolidone as a dispersion solvent to a solid content by weight of 40% followed by further mixing. Both sides of a 20 μm thick aluminum foil were coated with the slurry solution, the solvent was removed by drying, and thereafter, the coated aluminum foil was rolled with a roll press to obtain a positive electrode sheet.

<<Preparation of Negative Electrode Sheet>>

A slurry solution was prepared by mixing a graphite powder (Osaka Gas Chemicals Co., Ltd.) as the negative electrode active material, a styrene butadiene rubber and a carboxymethylcellulose aqueous solution as the binders at a solid content ratio by weight of 100/1.5/1.8, and adding water as a dispersion solvent to a solid content by weight of 45% followed by further mixing. Both sides of an 18 μm thick copper foil were coated with the slurry solution, the solvent was removed by drying, and thereafter, the coating copper foil was rolled with a roll press to obtain a negative electrode sheet.

<<Preparation of Nonaqueous Electrolytic Solution>>

$LiPF_6$ was contained at 1 mol/L in a mixed solvent in which ethylene carbonate and ethyl methyl carbonate as nonaqueous solvents were mixed at a volume ratio of 1:2 to prepare the solution.

<<Fabrication of Lithium Ion Secondary Battery>>

The positive electrode sheet and the negative electrode sheet as prepared in the manner described above were each combined on each side of the separator obtained in the Examples and Comparative Examples described below to form a laminate. The obtained laminate was inserted into a package (outer package) composed of an aluminum laminate film in which both surfaces of an aluminum foil (thickness of 40 μm) were covered with resin layers, with positive and negative electrode terminals being protruded from the package. Thereafter, the nonaqueous electrolytic solution as prepared in the manner described above was injected into the outer package, and the package was subjected to vacuum sealing to fabricate a Pouch type lithium ion secondary battery.

<<Initial Charge and Discharge of Lithium Ion Secondary Battery>>

The Pouch type lithium ion secondary battery was housed in a thermostatic chamber "PLM-735" (manufactured by Futaba K. K.) set at 25° C. and connected to a charge/discharge apparatus "ACD-01" (manufactured by Aska Electronic Co., Ltd.). Next, the charge and discharge cycle wherein the secondary battery was charged with a constant current of 0.1 C until the voltage reached 4.2V, then charged with a constant voltage of 4.2V for 1 hour, and discharged down to 3.0V with a constant current of 0.1 C, was repeated three times. Thereafter it was charged with a constant current of 0.1 C until the voltage reached 4.2V to complete full charge of the lithium ion battery. In this regard, 1 C is defined as a current value with which a battery is discharged to full capacity in 1 hour, and 0.1 C denotes 1/10 thereof.

<<20 C Discharge Tests of Lithium Ion Secondary Battery>>

The Pouch type lithium ion secondary battery after the initial charge/discharge was housed in a thermostatic chamber "PLM-735" (manufactured by Futaba K. K.) set at 25° C. and connected with a charge/discharge apparatus "ACD-01" (manufactured by Aska Electronic Co., Ltd.). Next, the secondary battery was charged with a constant current of ⅓ C until the voltage reached 4.2V, thereafter charged with a constant voltage of 4.2V for one hour and discharged down to 3.0V with a constant current of 1 C. Subsequently, it was charged with a constant current of ⅓ C until the voltage reached 4.2V, charged with a constant voltage of 4.2V for one hour, and discharged down to 3.0V with a constant current of 20 C. From the results on the series of charge/discharge described above, the 20 C capacity retention ratio was calculated according to the equation below:

20 C capacity retention ratio (%)=20 C discharging capacity/1 C discharging capacity×100

<<Cycle Tests of Lithium Ion Secondary Battery>>

The Pouch type lithium ion secondary battery after 20 C discharge tests was housed in a thermostatic chamber "LM-73S" (manufactured by Futaba K. K.) set at 50° C. and connected with a charge/discharge apparatus "ACD-01" (manufactured by Aska Electronic Co., Ltd.). Next, the secondary battery was charged at a constant current of 1 C until the voltage reached 4.2V, thereafter charged with a constant voltage of 4.2V for one hour and discharged down to 3.0V with a constant current of 1 C. The series of charge/discharge described above was defined as 1 cycle. Then, 100 cycles were carried out and the capacity retention ratio (%) after the 100 cycles was measured. Here, the capacity retention ratio (%) after 100 cycles was obtained according to the equation below:

Capacity retention ratio (%) after 100 cycles=discharging capacity at 100 cycles/discharging capacity at 1 cycle×100

The materials used in Examples and Comparative Examples are as follows.

(1) Polyolefin Resin

Polyethylene A (UH650, manufactured by Asahi Kasei Corporation) having a viscosity-average molecular weight of 700,000 and a melting point of 135° C.

Polyethylene B (7000 FP, manufactured by Prime Polymer Co., Ltd.) having a viscosity-average molecular weight of 260,000 and a melting point of 131° C.

Polyethylene C (UH850, manufactured by Asahi Kasei Corporation) having a viscosity-average molecular weight of 2,000,000 and a melting point of 135° C.

(2) Ionic Compounds and Metal Oxides

Barium sulfate (coprecipitation method) with an average particle size of 10 nm

Barium sulfate (coprecipitation method) with an average particle size of 50 nm

Barium sulfate (ore pulverizing method) with an average particle size of 660 nm

Sodium phosphate (coprecipitation method) with an average particle size of 500 nm Aluminum sulfate (coprecipitation method) with an average particle size of 800 nm Lithium fluoride with an average particle size of 30 nm Silica (combustion method) with an average particle size of 16 nm Alumina (combustion method) with an average particle size of 10 nm Boehmite (hydrothermal synthesis method) with an average particle size of 800 nm Potassium titanate with an average particle size of 400 nm (3) Plasticizer Liquid paraffin with a kinetic viscosity of 70.6 cSt at 40° C.

(4) Antioxidants

Tetrakis-[methylene-(3',5'-di-t-butyl-4'-hydroxyphenyl)propionate]methane

Example 1

Polyethylene A (85 parts by weight), barium sulfate (15 parts by weight) having an average particle size of 50 nm, and an antioxidant (0.85 parts by weight) were dry-blended with a Henschel mixer to obtain a mixed raw material.

The mixed raw material was fed by a feeder to a twin-screw extruder under a nitrogen atmosphere. Also, liquid paraffin was injected into the extruder cylinder by a plunger pump. The operating conditions of the feeder and pump were adjusted so that the proportion of liquid paraffin was 66 parts by weight and the proportion of the sum of the polymer and ionic compound was 34 parts by weight in the total mixture extruded. Then, these were melt-kneaded while heating to 200° C. in a twin-screw extruder, and the resulting melt-kneaded product was extruded through a T-die onto a cooling roll controlled to a surface temperature of 90° C. The product was brought into contact with the cooling roll, molded and solidified by cooling to obtain a sheet molding.

The sheet molding was stretched at a temperature of 122° C. at a stretching ratio of 7×6.4 times with a simultaneous biaxial stretching machine, and the stretched product was immersed in methylene chloride to extract and remove liquid paraffin, and then dried. Next, the obtained stretched sheet was stretched 1.8 times in a width direction at a temperature of 134° C. using a uniaxial stretching machine, and then the stretched sheet was relaxed about 20% in the width direction to obtain a separator. The evaluation results of the obtained separator are shown in Table 1.

Example 2

A separator was fabricated in the same manner as in Example 1 with the exception of using mixed raw materials obtained by dry-blending polyethylene A (70 parts by weight), barium sulfate (30 parts by weight) having an average particle size of 50 nm, and the antioxidant (0.7 parts by weight) using a Henschel mixer, in place of the mixed raw materials of Example 1. The evaluation results of the obtained separator are shown in Table 1.

Example 3

A separator was fabricated in the same manner as in Example 1 with the exception of using mixed raw materials obtained by dry-blending polyethylene A (40 parts by weight), barium sulfate (60 parts by weight) having an average particle size of 50 nm, and the antioxidant (0.4 parts by weight) using a Henschel mixer, in place of the mixed raw material of Example 1. The evaluation results of the obtained separator are shown in Table 1.

Example 4

A separator was fabricated in the same manner as in Example 1 with the exception of using mixed raw materials obtained by dry-blending polyethylene A (20 parts by weight), barium sulfate (80 parts by weight) having an average particle size of 50 nm, and the antioxidant (0.2 parts by weight) using a Henschel mixer, in place of the mixed raw materials of Example 1. The evaluation results of the obtained separator are shown in Table 1.

Example 5

A separator was fabricated in the same manner as in Example 1 with the exception of using barium sulfate having an average particle size of 10 nm in place of barium sulfate having an average particle size of 50 nm of Example 1. The evaluation results of the obtained separator are shown in Table 1.

Example 6

A separator was fabricated in the same manner as in Example 2 with the exception of using barium sulfate having an average particle size of 10 nm in place of barium sulfate having an average particle size of 50 nm of Example 2. The evaluation results of the obtained separator are shown in Table 1.

Example 7

A separator was fabricated in the same manner as in Example 3 with the exception of using barium sulfate having an average particle size of 10 nm in place of barium sulfate having an average particle size of 50 nm of Example 3. The evaluation results of the obtained separator are shown in Table 1.

Example 8

A separator was fabricated in the same manner as in Example 4 with the exception of using barium sulfate having an average particle size of 10 nm in place of barium sulfate having an average particle size of 50 nm of Example 4. The evaluation results of the obtained separator are shown in Table 1.

Example 9

A separator was fabricated in the same manner as in Example 4 with the exception of using barium sulfate having an average particle size of 660 nm in place of barium sulfate having an average particle size of 50 nm of Example 4. The evaluation results of the obtained separator are shown in Table 1.

Example 10

A separator was fabricated in the same manner as in Example 1 with the exception of using polyethylene B in place of polyethylene A of Example 1. The evaluation results of the obtained separator are shown in Table 1.

Example 11

A separator was fabricated in the same manner as in Example 1 with the exception of using sodium phosphate having an average particle size of 500 nm in place of barium sulfate having an average particle size of 50 nm of Example 1. The evaluation results of the obtained separator are shown in Table 1.

Example 12

A separator was fabricated in the same manner as in Example 2 with the exception of using sodium phosphate having an average particle size of 500 nm in place of barium sulfate having an average particle size of 50 nm of Example 2. The evaluation results of the obtained separator are shown in Table 2.

Example 13

A separator was fabricated in the same manner as in Example 3 with the exception of using sodium phosphate having an average particle size of 500 nm in place of barium sulfate having an average particle size of 50 nm of Example 3. The evaluation results of the obtained separator are shown in Table 2.

Example 14

A separator was fabricated in the same manner as in Example 4 with the exception of using sodium phosphate having an average particle size of 500 nm in place of barium sulfate having an average particle size of 50 nm of Example 4. The evaluation results of the obtained separator are shown in Table 2.

Example 15

A separator was fabricated in the same manner as in Example 1 with the exception of using mixes raw materials obtained by dry-blending polyethylene C (5 parts by weight), sodium phosphate (95 parts by weight) having an average particle size of 500 nm, and the antioxidant (0.05 parts by weight) using a Henschel mixer, in place of the mixed raw materials of Example 1. The evaluation results of the obtained separator are shown in Table 2.

Example 16

A separator was fabricated in the same manner as in Example 1 with the exception of using aluminum sulfate having an average particle size of 800 nm in place of barium sulfate having an average particle size of 50 nm of Example 1. The evaluation results of the obtained separator are shown in Table 2.

Example 17

A separator was fabricated in the same manner as in Example 2 with the exception of using aluminum sulfate having an average particle size of 800 nm in place of barium sulfate having an average particle size of 50 nm of Example 2. The evaluation results of the obtained separator are shown in Table 2.

Example 18

A separator was fabricated in the same manner as in Example 3 with the exception of using aluminum sulfate having an average particle size of 800 nm in place of barium sulfate having an average particle size of 50 nm of Example 3. The evaluation results of the obtained separator are shown in Table 2.

Example 19

A separator was fabricated in the same manner as in Example 4 with the exception of using aluminum sulfate having an average particle size of 800 nm in place of barium sulfate having an average particle size of 50 nm of Example 4. The evaluation results of the obtained separator are shown in Table 2.

Example 20

A separator was fabricated in the same manner as in Example 15 with the exception of using aluminum sulfate having an average particle size of 800 nm in place of sodium phosphate having an average particle size of 500 nm of Example 15. The evaluation results of the obtained separator are shown in Table 2.

Example 21

A separator was fabricated in the same manner as in Example 1 with the exception of using lithium fluoride having an average particle size of 30 nm in place of barium sulfate having an average particle size of 50 nm of Example 1. The evaluation results of the obtained separator are shown in Table 2.

Example 22

A separator was fabricated in the same manner as in Example 2 with the exception of using lithium fluoride having an average particle size of 30 nm in place of barium sulfate having an average particle size of 50 nm of Example 2. The evaluation results of the obtained separator are shown in Table 2.

Example 23

A separator was fabricated in the same manner as in Example 3 with the exception of using lithium fluoride having an average particle size of 30 nm in place of barium sulfate having an average particle size of 50 nm of Example 3. The evaluation results of the obtained separator are shown in Table 2.

Example 24

A separator was fabricated in the same manner as in Example 4 with the exception of using lithium fluoride having an average particle size of 30 nm in place of barium sulfate having an average particle size of 50 nm of Example 4. The evaluation results of the obtained separator are shown in Table 2.

Example 25

A separator was fabricated in the same manner as in Example 15 with the exception of using lithium fluoride having an average particle size of 30 nm in place of sodium phosphate having an average particle size of 500 nm of Example 15. The evaluation results of the obtained separator are shown in Table 2.

Example 26

A separator was fabricated in the same manner as in Example 1 with the exception of using mixed raw materials obtained by dry-blending polyethylene C (14 parts by weight), barium sulfate (86 parts by weight) having an average particle size of 50 nm, and the antioxidant (0.14 parts by weight) using a Henschel mixer, in place of the mixed raw materials of Example 1. The evaluation results of the obtained separator are shown in Table 2.

Example 27

A separator was fabricated in the same manner as in Example 1 with the exception of using mixed raw materials obtained by dry-blending polyethylene C (10 parts by weight), barium sulfate (90 parts by weight) having an average particle size of 50 nm, and the antioxidant (0.1 parts by weight) using a Henschel mixer, in place of the mixed raw materials of Example 1. The evaluation results of the obtained separator are shown in Table 2.

Example 28

A separator was fabricated in the same manner as in Example 15 with the exception of using barium sulfate having an average particle size of 50 nm in place of sodium phosphate having an average particle size of 500 nm of Example 15. The evaluation results of the obtained separator are shown in Table 2.

Example 29

A separator was fabricated in the same manner as in Example 1 with the exception of using mixed raw materials obtained by dry-blending polyethylene C (1 part by weight), barium sulfate (99 parts by weight) having an average particle size of 50 nm, and the antioxidant (0.01 parts by weight) using a Henschel mixer, in place of the mixed raw materials of Example 1. The evaluation results of the obtained separator are shown in Table 2.

Comparative Example 1

A separator was fabricated in the same manner as in Example 1 with the exception of using mixed raw materials obtained by dry-blending polyethylene A (100 parts by weight) and the antioxidant (1 part by weight) using a Henschel mixer, in place of the mixed raw materials of Example 1. The evaluation results of the obtained separator are shown in Table 1.

Comparative Example 2

Polyethylene B (50 parts by weight), barium sulfate (50 parts by weight) having an average particle size of 660 nm, and the antioxidant (0.5 parts by weight) were dry-blended with a Henschel mixer to obtain a mixed raw material. Next, the mixed raw material was fed into a twin-screw kneader, and melt-kneaded while heating to 180° C., and the obtained melt-kneaded product was subjected to thermal compression at 180° C. to obtain a raw sheet. Thereafter, the raw sheet was subjected to simultaneous biaxial stretching at a temperature of 135° C. and a stretching ratio of 2×2. Subsequently, simultaneous biaxial stretching at a ratio of 3×3 was carried out at 125° C. The evaluation results of the obtained separator are shown in Table 1.

Comparative Example 3

A separator was fabricated in the same manner as in Example 3 with the exception of using silica having an average particle size of 16 nm in place of barium sulfate having an average particle size of 50 nm of Example 3. The evaluation results of the obtained separator are shown in Table 1.

Comparative Example 4

A separator was fabricated in the same manner as in Example 3 with the exception of using alumina having an average particle size of 10 nm in place of barium sulfate having an average particle size of 50 nm of Example 3. The evaluation results of the obtained separator are shown in Table 1.

Comparative Example 5

A separator was fabricated in the same manner as in Example 3 with the exception of using boehmite having an average particle size of 800 nm in place of barium sulfate having an average particle size of 50 nm of Example 3. The evaluation results of the obtained separator are shown in Table 2.

Comparative Example 6

A separator was fabricated in the same manner as in Example 3 with the exception of using potassium titanate ($K_2O \cdot 8TiO_2$) having an average particle size of 400 nm in place of barium sulfate having an average particle size of 50 nm of Example 3. The evaluation results of the obtained separator are shown in Table 2.

TABLE 1

| | | | Examp. 1 | Examp. 2 | Examp. 3 | Examp. 4 | Examp. 5 | Examp. 6 | Examp. 7 | Examp. 8 |
|---|---|---|---|---|---|---|---|---|---|---|
| Raw materials of separator | Polyolefin resin | Type | PE | PE | PE | PE | PE | PE | PE | PE |
| | | Use amount (% by weight) | 85 | 70 | 40 | 20 | 85 | 70 | 40 | 20 |
| | | $Mv(10^4)$ | 70 | 70 | 70 | 70 | 70 | 70 | 70 | 70 |
| | Ionic compound | Type | $BaSO_4$ | $BaSO_4$ | $BaSO_4$ | $BaSO_4$ | $BaSO_4$ | $BaSO_4$ | $BaSO_4$ | $BaSO_4$ |
| | | Use amount (% by weight) | 15 | 30 | 60 | 80 | 15 | 30 | 60 | 80 |
| | | Ave. particle size (nm) | 50 | 50 | 50 | 50 | 10 | 10 | 10 | 10 |
| | Metal oxide | Type | — | — | — | — | — | — | — | — |
| | | Use amount (% by weight) | — | — | — | — | — | — | — | — |
| | | Ave. particle size (nm) | — | — | — | — | — | — | — | — |
| Separator properties | | Membrane thickness (μm) | 12 | 15 | 18 | 20 | 11 | 14 | 17 | 19 |
| | | Porosity (%) | 56 | 60 | 64 | 67 | 53 | 62 | 66 | 70 |

TABLE 1-continued

|  |  | Examp. 1 | Examp. 2 | Examp. 3 | Examp. 4 | Examp. 5 | Examp. 6 | Examp. 7 | Examp. 8 |
|---|---|---|---|---|---|---|---|---|---|
|  | Air permeability (sec./100 cc) | 50 | 65 | 80 | 90 | 45 | 60 | 70 | 80 |
|  | Puncture strength (gf) | 330 | 400 | 340 | 280 | 320 | 390 | 330 | 280 |
|  | Degree of whiteness | 103.2 | 102.1 | 101.4 | 100.3 | 102.8 | 102.4 | 100.8 | 100.1 |
|  | Voltage resistance (kV/20 μm) | 2.2 | 2.0 | 1.9 | 1.8 | 2.2 | 2.0 | 1.9 | 1.8 |
|  | Solder test (mm$^2$) | 8.2 | 7.8 | 6.8 | 5.2 | 8.0 | 7.6 | 6.5 | 5.0 |
| Test of lithium ion secondary battery | 20 C capacity retention ratio (%) | 39 | 30 | 24 | 22 | 43 | 33 | 28 | 24 |
|  | Capacity retention ratio after 100 cycles (%) | 80 | 81 | 80 | 80 | 80 | 81 | 80 | 80 |

|  |  |  | Examp. 9 | Examp. 10 | Examp. 11 | Comp. Examp. 1 | Comp. Examp. 2 | Comp. Exmp. 3 | Comp. Examp. 4 |
|---|---|---|---|---|---|---|---|---|---|
| Raw materials of separator | Polyolefin resin | Type | PE | PE | PE | PE | PE | PE | PE |
|  |  | Use amount (% by weight) | 20 | 85 | 85 | 100 | 50 | 40 | 40 |
|  |  | Mv(10$^4$) | 70 | 26 | 70 | 70 | 26 | 70 | 70 |
|  | Ionic compound | Type | BaSO$_4$ | BaSO$_4$ | Na$_3$PO$_4$ | — | BaSO$_4$ | — | — |
|  |  | Use amount (% by weight) | 80 | 15 | 15 | — | 50 | — | — |
|  |  | Ave. particle size (nm) | 660 | 50 | 500 | — | 660 | — | — |
|  | Metal oxide | Type | — | — | — | — | — | SiO$_2$ | Al$_2$O$_3$ |
|  |  | Use amount (% by weight) | — | — | — | — | — | 60 | 60 |
|  |  | Ave. particle size (nm) | — | — | — | — | — | 16 | 10 |
| Separator properties | Membrane thickness (μm) |  | 24 | 12 | 14 | 12 | 26 | 17 | 17 |
|  | Porosity (%) |  | 80 | 55 | 55 | 48 | 47 | 65 | 65 |
|  | Air permeability (sec./100 cc) |  | 70 | 50 | 60 | 130 | 160 | 65 | 65 |
|  | Puncture strength (gf) |  | 230 | 240 | 320 | 330 | 340 | 320 | 320 |
|  | Degree of whiteness |  | 98.2 | 99.4 | 101.8 | 100.3 | 97.2 | 95.6 | 96.5 |
|  | Voltage resistance (kV/20 μm) |  | 1.5 | 2.0 | 2.1 | 2.2 | 1.1 | 1.3 | 1.2 |
|  | Solder test (mm$^2$) |  | 7.0 | 8.4 | 8.4 | 9.4 | 7.2 | 6.4 | 6.2 |
| Test of lithium ion secondary battery | 20 C capacity retention ratio (%) |  | 28 | 39 | 32 | 15 | 9 | 30 | 30 |
|  | Capacity retention ratio after 100 cycles (%) |  | 74 | 80 | 80 | 74 | 74 | 62 | 68 |

TABLE 2

|  |  |  | Examp. 12 | Examp. 13 | Examp. 14 | Examp. 15 | Examp. 16 | Examp. 17 | Examp. 18 | Examp. 19 | Examp. 20 | Examp. 21 |
|---|---|---|---|---|---|---|---|---|---|---|---|---|
| Raw materials of separator | Polyolefin resin | Type | PE | PE | PE | PE | PE | PE | PE | PE | PE | PE |
|  |  | Use amount (% by weight) | 70 | 40 | 20 | 5 | 85 | 70 | 40 | 20 | 5 | 85 |
|  |  | Mv(10$^4$) | 70 | 70 | 70 | 200 | 70 | 70 | 70 | 70 | 200 | 70 |
|  | Ionic compound | Type | Na$_3$PO$_4$ | Na$_3$PO$_4$ | Na$_3$PO$_4$ | Na$_3$PO$_4$ | Al$_2$(SO$_4$)$_3$ | Al$_2$(SO$_4$)$_3$ | Al$_2$(SO$_4$)$_3$ | Al$_2$(SO$_4$)$_3$ | Al$_2$(SO$_4$)$_3$ | LiF |
|  |  | Use amount (% by weight) | 30 | 60 | 80 | 95 | 15 | 30 | 60 | 80 | 95 | 15 |
|  |  | Ave. particle size (nm) | 500 | 500 | 500 | 500 | 800 | 800 | 800 | 800 | 800 | 30 |
|  | Metal oxide | Type | — | — | — | — | — | — | — | — | — | — |
|  |  | Use amount (% by weight) | — | — | — | — | — | — | — | — | — | — |
|  |  | Ave. particle size (nm) | — | — | — | — | — | — | — | — | — | — |
| Separator properties | Membrane thickness (μm) |  | 18 | 19 | 20 | 22 | 15 | 17 | 19 | 22 | 25 | 13 |
|  | Porosity (%) |  | 59 | 64 | 68 | 72 | 58 | 61 | 65 | 70 | 74 | 55 |
|  | Air permeability (sec./100 cc) |  | 70 | 85 | 80 | 100 | 65 | 75 | 95 | 105 | 100 | 55 |
|  | Puncture strength (gf) |  | 300 | 330 | 300 | 260 | 330 | 340 | 310 | 270 | 240 | 320 |
|  | Degree of whiteness |  | 101.0 | 101.9 | 99.5 | 99.9 | 100.7 | 99.6 | 98.6 | 98.1 | 98.7 | 102.0 |

TABLE 2-continued

|  |  | Examp. 22 | Examp. 23 | Examp. 24 | Examp. 25 | Examp. 26 | Examp. 27 | Examp. 28 | Examp. 29 | Comp. Examp. 5 | Comp. Examp. 6 |
|---|---|---|---|---|---|---|---|---|---|---|---|
|  | Voltage resistance (kV/20 μm) | 2.0 | 1.8 | 1.8 | 1.6 | 1.9 | 1.8 | 1.7 | 1.6 | 1.4 | 2.2 |
|  | Solder test (mm²) | 7.9 | 7.2 | 6.2 | 5.2 | 8.3 | 7.7 | 7.1 | 6.1 | 5.0 | 8.3 |
| Test of lithium ion secondary battery | 20 C capacity retention ratio (%) | 32 | 26 | 28 | 20 | 36 | 29 | 21 | 20 | 21 | 38 |
|  | Capacity retention ratio after 100 cycles (%) | 81 | 80 | 79 | 79 | 80 | 81 | 79 | 78 | 79 | 80 |

|  |  |  | Examp. 22 | Examp. 23 | Examp. 24 | Examp. 25 | Examp. 26 | Examp. 27 | Examp. 28 | Examp. 29 | Comp. Examp. 5 | Comp. Examp. 6 |
|---|---|---|---|---|---|---|---|---|---|---|---|---|
| Raw materials of separator | Polyolefin resin | Type | PE | PE | PE | PE | PE | PE | PE | PE | PE | PE |
|  |  | Use amount (% by weight) | 70 | 40 | 20 | 5 | 14 | 10 | 5 | 1 | 40 | 40 |
|  |  | Mv(10⁴) | 70 | 70 | 70 | 200 | 200 | 200 | 200 | 200 | 70 | 70 |
|  | Ionic compound | Type | LiF | LiF | LiF | LiF | BaSO₄ | BaSO₄ | BaSO₄ | BaSO₄ | — | — |
|  |  | Use amount (% by weight) | 30 | 60 | 80 | 95 | 86 | 90 | 95 | 99 | — | — |
|  |  | Ave. particle size (nm) | 30 | 30 | 30 | 30 | 50 | 50 | 50 | 50 | — | — |
|  | Metal oxide | Type | — | — | — | — | — | — | — | — | AlOOH | K₂O•8TiO₂ |
|  |  | Use amount (% by weight) | — | — | — | — | — | — | — | — | 60 | 60 |
|  |  | Ave. particle size (nm) | — | — | — | — | — | — | — | — | 800 | 400 |
| Separator properties |  | Membrane thickness (μm) | 15 | 18 | 21 | 23 | 22 | 24 | 25 | 25 | 16 | 19 |
|  |  | Porosity (%) | 59 | 64 | 66 | 71 | 69 | 70 | 72 | 75 | 59 | 56 |
|  |  | Air permeability (sec./100 cc) | 65 | 80 | 95 | 100 | 95 | 100 | 110 | 110 | 70 | 85 |
|  |  | Puncture strength (gf) | 390 | 330 | 270 | 250 | 220 | 140 | 80 | 50 | 300 | 310 |
|  |  | Degree of whiteness | 101.4 | 99.5 | 99.6 | 99.8 | 100.3 | 100.2 | 99.4 | 99.2 | 99.0 | 96.8 |
|  |  | Voltage resistance (kV/20 μm) | 2.1 | 1.9 | 1.8 | 1.6 | 1.7 | 1.6 | 1.6 | 1.5 | 1.6 | 1.7 |
|  |  | Solder test (mm²) | 7.7 | 6.9 | 5.3 | 4.2 | 4.6 | 4.2 | 3.8 | 2.0 | 6.7 | 6.5 |
| Test of lithium ion secondary battery |  | 20 C capacity retention ratio (%) | 30 | 25 | 21 | 20 | 21 | 20 | 18 | 18 | 28 | 23 |
|  |  | Capacity retention ratio after 100 cycles (%) | 80 | 79 | 81 | 80 | 80 | 79 | 80 | 81 | 66 | 59 |

From Tables 1 and 2, the hole areas in the solder test are smaller and the heat resistances are superior in Examples 1 to 29, in contrast with those in Comparative Example 1 in which the ionic compound is not contained. Furthermore, 20 C discharging capacities are significantly higher and the capacity retention ratios after 100 cycles are also equal or higher in Examples 1 to 29, as compared with those in Comparative Example 1. Therefore, it is understood that the separator of the present embodiment is capable of improving safety, output characteristics, and durability of the electricity storage device.

Next, in Examples 1 to 29, the 20 C discharging capacities are remarkably higher and the capacity retention ratios after 100 cycles are equivalent or high as compared with those in Comparative Example 2 in which the separator was fabricated by the dry pore-forming method without using a plasticizer. Furthermore, Examples 1 to 29 exhibit the higher degrees of whiteness of the separator than Comparative Example 2 and are superior in voltage resistance. Therefore, it is comprehended that the separator of the present embodiment is superior in improving reliability, output characteristics, and durability of the electricity storage device.

Further, Examples 1 to 29 exhibit the higher degrees of whiteness of the separator and more favorable voltage resistances as compared with Comparative Examples 3, 4 and 6 in which the metal oxides are contained instead of the ionic compounds. Furthermore, as compared with Comparative Examples 3, 4, 5 and 6, Examples 1 to 29 also exhibit remarkably the higher capacity retention ratio values after 100 cycles. Therefore, it is understood that the separator of the present embodiment is superior in terms of improving reliability and durability of the electricity storage device.

From all those described above, it has clearly been found that the separator for electricity storage devices which has the porous layer comprising the polyolefin resin and the ionic compound, and exhibits the specific degree of whiteness, not only favorably functions as a separator, but also contributes to safety of the electricity storage device at elevated temperatures, and furthermore, enables to contribute to the improvement of the output characteristics and durability of the electricity storage device.

The invention claimed is:
1. A separator configured for a lithium-ion secondary battery, which has a porous layer comprising a mixture of a polyolefin resin and an ionic compound, wherein a content of the ionic compound in the porous layer is 86% by weight or more and 99% by weight or less in the porous layer and a degree of whiteness of the separator is greater than 98.0, and the degree of whiteness is measured using a colorimeter under a condition that does not include a specular reflection light in a 2° viewing angle.

2. The separator configured for a lithium-ion secondary battery according to claim 1, wherein the degree of whiteness is 98.5 or more and 105 or less.

3. The separator configured for a lithium-ion secondary battery according to claim 1, wherein the polyolefin resin contains polyethylene having a viscosity-average molecular weight of 600,000 or more and 5,000,000 or less.

4. The separator configured for a lithium-ion secondary battery according to claim 1, wherein a content of metal oxide in the separator for electricity storage devices is 10% by weight or less.

5. The separator configured for a lithium-ion secondary battery according to claim 1, wherein the ionic compound has one or more anions selected from the group consisting of a sulfate ion, a nitrate ion, a phosphate ion, and a halide ion.

6. The separator configured for a lithium-ion secondary battery according to claim 1, wherein the ionic compound has one or more cations selected from the group consisting of an alkali metal ion and an alkaline earth metal ion.

7. The separator configured for a lithium-ion secondary battery according to claim 1, wherein the ionic compound is barium sulfate.

8. The separator configured for a lithium-ion secondary battery according to claim 1, wherein an average particle size of the ionic compound is 5 nm or more and 600 nm or less.

9. The separator configured for a lithium-ion secondary battery according to claim 1, wherein an average pore size of the separator for electricity storage devices is 10 nm or more and 100 nm or less.

10. The separator configured for a lithium-ion secondary battery according to claim 1, wherein an air permeability of the separator for electricity storage devices is 10 seconds/100 ml or longer and 500 seconds/100 ml or shorter.

11. The separator configured for a lithium-ion secondary battery according to claim 1, wherein a puncture strength of the separator for electricity storage devices is 100 gf or more and 600 gf or less.

12. The separator configured for a lithium-ion secondary battery according to claim 1, wherein a viscosity-average molecular weight of the polyolefin resin comprised in the separator for electricity storage devices is 300,000 or more and 5,000,000 or less.

13. An electricity storage device comprising a positive electrode, a negative electrode, and the separator configured for a lithium-ion secondary battery according to claim 1.

14. The separator configured for a lithium-ion secondary battery according to claim 1, wherein the thickness of the separator is 20 μm or thinner, and the degree of whiteness is measured under a condition in which the separator is folded to a total thickness of 20 μm or more.

* * * * *